United States Patent

Markham

[15] 3,635,271

[45] Jan. 18, 1972

[54] CUTTERHEAD AND SHEAR BAR FOR FORAGE HARVESTERS

[72] Inventor: David Rees Markham, Ottumwa, Iowa

[73] Assignee: Deere & Company, Moline, Ill.

[22] Filed: Aug. 26, 1970

[21] Appl. No.: 67,006

[52] U.S. Cl. .............................. 146/117, 146/107, 56/250
[51] Int. Cl. ................................................. A01d 55/18
[58] Field of Search ............... 146/107, 117, 118, 119, 120, 146/121; 241/197, 300; 143/133 B; 56/250; 83/355

[56] References Cited

UNITED STATES PATENTS

| 3,452,796 | 8/1966 | Hennen | 146/242 |
| 3,045,934 | 7/1962 | Eilers | 241/197 |
| 3,023,490 | 3/1962 | Dawson | 143/133 B |
| 2,763,439 | 9/1956 | Mankoff | 241/197 |

Primary Examiner—Willie G. Abercrombie
Attorney—H. Vincent Harsha, Harold M. Knoth, William A. Murray and Raymond L. Hollister

[57] ABSTRACT

A forage harvester reel-type cutterhead having a plurality of angularly spaced knives with cutting edges on the outer periphery thereof and defining an imaginary cylindrical surface as the cutterhead rotates. The knives coact with a stationary shear bar to reduce crop material fed into the cutterhead housing by conveyor means on the harvester, the shear bar having a cutting edge generally parallel with the axis of the cutterhead and extending in close proximity to the imaginary cylindrical surface defined thereby. Each of the knives and the shear bar have a hardened, wear-resistant portion on their adjacent, substantially parallel end surfaces bordering their respective cutting edges, the hardened portions of the knives lying substantially on the imaginary cylindrical surface. During operation of the cutterhead, the softer face surfaces of the knives and shear bar wear away from the respective cutting edges to thereby maintain the sharpness of the latter. Despite such wear the clearance between the respective cutting edges of the knives and shear bar remains substantially constant during operation due to the particular configuration and relationship of the respective end surfaces of the knives and shear bar.

31 Claims, 2 Drawing Figures

PATENTED JAN 18 1972

3,635,271

INVENTOR.
DAVID R. MARKHAM

CUTTERHEAD AND SHEAR BAR FOR FORAGE HARVESTERS

BACKGROUND OF THE INVENTION

This invention relates generally to a forage harvester, and more particularly to a cutterhead and shear bar therefor which require substantially less maintenance than those of conventional design.

Proper maintenance of the conventional forage harvester cutterhead and shear bar has traditionally involved considerable difficulty, time, and expense. During operation of the harvester, the cutting edges and leading or face surfaces of the cutterhead knives and shear bar are subjected to considerable pressure which eventually results in wear of these surfaces and consequent deterioration of the cutting edges. This problem has been met in the past by applying a thin layer of highly wear resistant material to, or hardfacing, these areas of greatest wear. Although the operational life of the cutting edges is extended in this manner, over a period of time the hardened surfaces wear to a point at which the knives must be resharpened and the shear bar replaced. In addition, it has been found that the softer metal supporting the hardfacing material on the knives also wears away during such operation, leaving the material unsupported and resulting in a chipping or breaking away of the edge. As the edge deteriorates through such wear and chippage, the clearance between the knife and shear bar increases due to the configuration of the outer end of the knife. Further contributing to an increased clearance between the knives and shear bar is the fact that wear of the latter causes the effective cutting edge thereof to move radially outwardly from the cutterhead. Thus, two factors contribute to a reduction in cutting efficiency over a period of time: deterioration of the cutting and shear edges, and excess clearance between the knife and shear bar.

Optimum performance of the cutterhead and shear bar thus requires that the cutting edges of the knives be periodically resharpened, that the shear bar edge be restored, and that the knife-shear bar clearance be reset to its proper dimension. In the past, removal of the knives from the cutterhead was required before they could be sharpened, a fairly inexpensive, though extremely tedious and time-consuming operation. In response to this problem, knife grinders were developed and are currently available which mount on the harvester and are operable to sharpen the knives without removing them from the cutterhead. Although greatly simplifying the sharpening operation, these built-in grinders significantly add to the cost of the harvester. In addition, the knife-shear bar clearance must still be reset after the grinding operation. The proper clearance is often difficult to achieve, and an improper clearance results in high-power requirements and generally poor cutting performance.

SUMMARY OF THE INVENTION

It is, accordingly, the primary object of the invention to provide a forage harvester cutterhead and shear bar requiring substantially less maintenance than those heretofore available. It is a further object to provide such cutting apparatus which costs no more than that of conventional design.

These and other objects are achieved, according to the invention, by the provision of a cutterhead knife and shear bar having outer end surfaces with a wear resistance much greater than that of the adjoining face surfaces. As the cutterhead operates, the softer face surfaces wear away from the hard cutting edge of the end surface, such wear producing sharper cutting edges on both the knife and shear bar. In this manner, operating wear, instead of deteriorating the cutting edges as is the case in cutting apparatus of conventional design, instead actually maintains and improves the sharpness of the edges. Since the cutting edge of the shear bar remains on the outer end surface thereof rather than advancing radially outwardly from the cutterhead as is the case with conventionally constructed shear bars, the clearance between the cutting edge of the bar and the cylindrical surface traced by the cutterhead remains substantially constant despite such operational wear. In addition, the outer end surfaces of the cutterhead knives are formed on the cylindrical surface traced by the cutting edge as the cutterhead rotates. As the cutting edge of the knife wears away through continued use, the knife-shear bar clearance is nevertheless maintained at its proper initial setting, thus obviating the necessity of periodically resetting this clearance.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
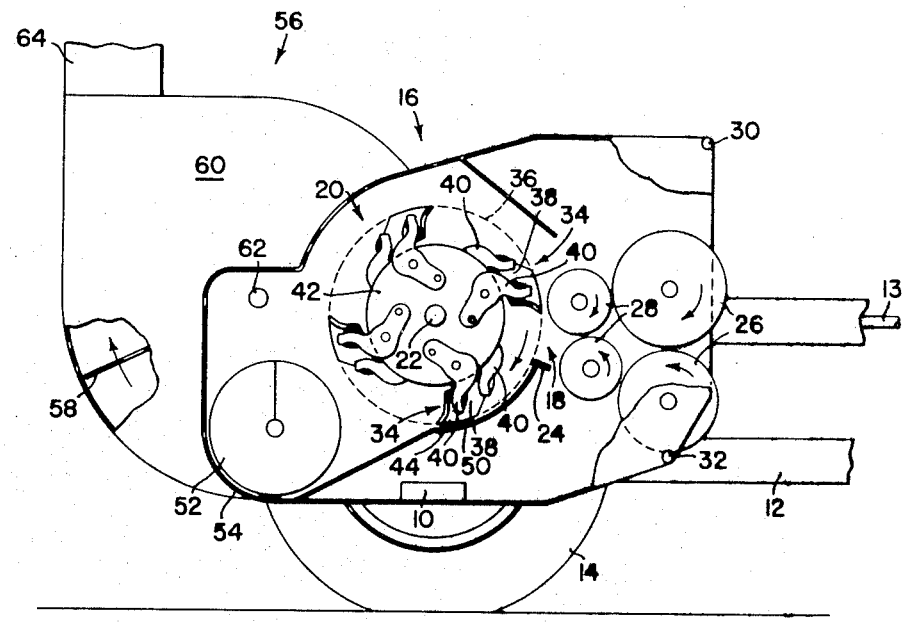
FIG. 1 is a side view of a forage harvester incorporating the cutterhead and shear bar of the invention, with portions broken away and parts removed for the sake of clarity.

Referring first to FIG. 1, the forage harvester in which the present invention is embodied is of the type disclosed in U.S. Pat. No. 3,377,785 to Kessler, and comprises, generally, an L-shaped frame including a transverse portion 10 and a longitudinal draft member 12 extending forwardly from the left side of the portion 10 and adapted at its forward end for connection to the drawbar of a tractor (not shown). The operating components of the harvester are driven from the power takeoff shaft of the tractor through a drive shaft 13 extending longitudinally above the member 12, and suitable drive transmission means (not shown) on the frame portion 10. The frame is supported on a pair of transversely spaced, ground-engaging wheels 14, the right wheel being removed in FIG. 1 for the sake of clarity. Mounted on the right lateral side of the transverse frame portion 10 is a cutterhead housing indicated generally by the numeral 16, and including a forward crop inlet opening 18, the end wall of the housing being broken away to illustrate the mechanism contained therein. A reel-type cutterhead 20, including a transverse horizontal shaft 22, is rotatable within the housing, in the direction indicated by the arrow, and cooperates with a stationery knife or shear bar 24 mounted adjacent to the housing inlet 18, to reduce crop material fed into the housing through the opening. The latter function is performed by the usual fore-and-aft pairs of upper and lower feed rolls 26 and 28, respectively. In operation, a harvesting attachment (not shown) is mounted on the forward end of the housing 16, on upper and lower mounting pins 30 and 32, and is operable to deliver the crop from the field rearwardly to the forward pair of feed rolls 26. A mat of crop material is advanced between the upper and lower forward rolls to the rear pair of rolls 28, which continue to advance the mat rearwardly through the cutterhead housing inlet 18.

The cutterhead 20 comprises four equally spaced knives 34 having cutting edges which define an imaginary cylindrical surface, indicated at 36, as the cutterhead rotates. Each of the knives 34 has a flat inner mounting portion 38 carried at its opposite ends on castings 40. The castings 40 are mounted on transversely spaced circular plates 42, which, in turn, are rigidly fixed to opposite ends of the shaft 22. To reduce the power requirement of the cutterhead, the outer portion 44 of the knife 34, including the cutting edge 46 formed thereon, is in the shape of a helix. As the cutting edge 46 of the knife 34 passes adjacent to the horizontal cutting or shear edge 48 of the stationary knife or shear bar 24, the material lying between the knives is thus sliced transversely rather than cut instantaneously along the entire edge. The material cut off the mat by each knife is moved downwardly and rearwardly across an arcuate panel 50 and delivered to an auger 52 which conveys the material laterally along a trough 54 to a blower 56 mounted on the left side of the harvester. The blower 56, comprising a plurality of radially extending paddles 58 rotatable within a housing 60 on a transverse shaft 62, blows the material upwardly through a discharge spout 64 which finally directs the material rearwardly into a trailing forage wagon (not shown).

Figure 2:
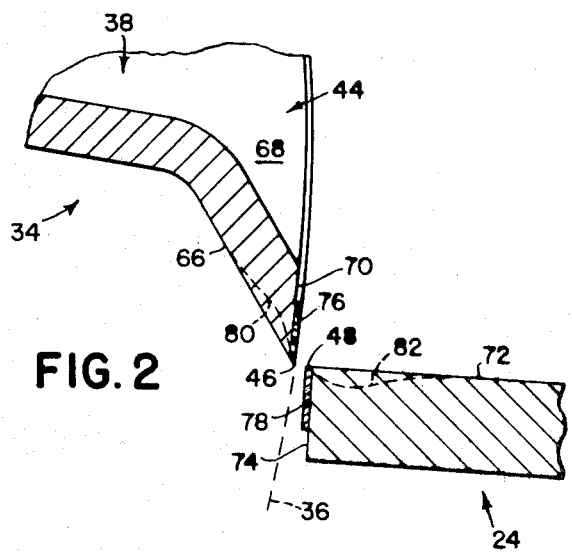
FIG. 2 is a greatly enlarged transverse sectional view of the adjacent ends of the cutterhead and shear bar, with certain dimensions exaggerated to better illustrate the invention.

Referring now to FIG. 2, the outer helical portion 44 of the cutterhead knife 34 includes a leading or face surface 66 extending outwardly from the cutterhead axis and terminating at the cutting edge 46 lying on the imaginary cylindrical surface defined by the knife. A spaced, generally parallel trailing surface 68 also terminates at an edge on the cylindrical surface, the latter edge being connected to the cutting edge 46 by an arcuate end surface 70. The stationary knife or shear bar 24 likewise includes a face or upper surface 72 generally radially disposed relative to the cutterhead 20, and an end or rear surface 74 generally tangentially disposed relative to the cutterhead. The surfaces 72 and 74 join each other to form the upper rear transverse corner of the bar 24, the corner comprising a relatively sharp horizontal cutting or shear edge 48 disposed in close proximity to the imaginary cylindrical surface 36.

A relatively thin layer of highly wear-resistant, hardfacing alloy, such as tungsten carbide, for example, is applied in a conventional manner, as by welding, to portions of both end surfaces 70 and 74, at 76 and 78, respectively. As illustrated in the drawing, the hardfaced portion of each knife is bounded by and forms the cutting edge of the respective knife. As a manufacturing expedient, the entire end surface of both knives 24 and 34 can be hardfaced without in any way departing from the scope of the invention. The thickness of the hardfacing material as shown in FIG. 2 is greatly out of proportion to that of the knives 24 and 36. In the embodiment illustrated, for example, the layers 76 and 78 are in the approximate range of 0.004 to 0.012 inch thick, while the knives 24 and 34 are in the approximate range of 0.375 to 0.500 inch thick. The layers 76 and 78 must be relatively thin to present a sufficiently sharp cutting edge when the adjoining softer metal wears away. In addition, the clearance between the knives 24 and 34 is also exaggerated in the drawings for the sake of clarity, this clearance normally being in the range of 0.005 to 0.015 inch. The foregoing dimensions are given for the purpose of disclosing a preferred embodiment of the invention only, and are in no way intended to limit the scope of the appended claims.

Over a period of operation of the cutterhead 20, the abrasive action of the crop material being cut causes the softer metal composing the cutterhead knives 34 to eventually wear away inwardly of the cutting edge 46. Since the layer 76 is substantially harder and thus more resistant to wear than the metal composing the remainder of the knife, the edge 46 wears at a substantially slower rate and the outer end of the knife eventually assumes the general shape indicated in exaggerated fashion by the dashed line 80. It will be apparent that wear of the surface 66 occurring during operation of the cutterhead thus actually perpetuates the sharpness of the cutting edge 46. In a similar manner, the abrasive action of the crop material being cut causes the softer metal composing the stationary knife or shear bar 24 to eventually wear away from the cutting edge 48 formed of the harder material 78, again due to the wear resistance differential existing between these surfaces. The face surface 72 of the knife 24 eventually assumes the general shape indicated in exaggerated fashion by the dashed line 82, thereby perpetuating the sharpness of the edge 48. In operation, a compressed mat of crop material is advanced rearwardly along the upper surface 72 of the shear bar 24 by the feed rolls 26 and 28. When engaged by the cutterhead knife 34, the mat is further compressed downwardly against the rear edge portion of the bar prior to its being sheared off by the interaction of the edges 46 and 48. The substantially continual pressure thus imposed on the cutterhead knives, in combination with the abrasive quality of the crop material being compressed, results in the wear indicated at 82. Similarly, the resistance imposed on the mat by the bar 24 causes the mat to exert a substantially equal pressure on the face surface 66 of the cutterhead knife 34 which in turn results in the wear indicated at 80. It will thus be apparent that the knives 34 and shear bar 24 cooperate not only to shear crop material, but also to maintain each other in a sharp condition. Since the end surface 70 of the cutterhead knife 34 lies on the cylindrical surface 36 rather than extends inwardly toward the cutterhead axis, as is conventional, wear of the cutting edge 46 or possible chippage thereof, will not affect the clearance between the knives 24 and 34. Prolonged operation of the cutting apparatus will cause the cutting edge 46 of the knife 24 to move rearwardly relative to the direction of travel of the knife along the layer 76 on the end surface 70. Similarly, such prolonged operation will cause the cutting edge 48 of the shear bar 24 to move downwardly along the layer 78 on the end surface 74. Since the cutting edge 48 thus remains on the end surface 74 rather than advancing radially outwardly along the surface 72 as would be the case with a conventionally constructed shear bar, the distance between the edge 48 and the surface 36, and thus the clearance between the edges 46 and 48, remains substantially constant. Due to this construction, cooperative action of the knives 34 and shear bar 24, in addition to shearing crop material and maintaining the sharpness of each other's cutting edges, also acts to substantially maintain the initial clearance between the edges 46 and 48. The slightly greater clearance provided between the lower portion of the surface 74 and the adjacent portion of the surface 36 is for the purpose of providing the necessary relief for the two cutting elements.

I claim:

1. In combination with a forage harvester having a frame, a cutterhead housing mounted on the frame and including a crop inlet opening, and conveyor means mounted adjacent to the inlet opening for advancing crop material into the housing through the opening, crop reducing means comprising: an axially horizontal, cylinder-type cutterhead rotatably mounted within the housing and including at least one knife having a relatively sharp cutting edge defining an imaginary cylindrical surface as the cutterhead rotates; and a stationary knife cooperating with the cutterhead knife to reduce the crop material, the stationary knife being mounted adjacent to the crop inlet opening in the housing and having a relatively sharp cutting edge substantially parallel with the axis of the cutterhead and in close proximity to the imaginary cylindrical surface defined by the cutterhead knife, each of the knives having an end surface terminating at its respective cutting edge, the end surface of the cutterhead knife lying substantially on the imaginary cylindrical surface defined by the cutting edge thereof and the end surface of the stationary knife being substantially equidistant from the surface defined by the cutting edge of the cutterhead knife as it passes in close proximity to the stationary knife, and a face surface adjoining the respective end surface along the respective cutting edge, the face surface of the cutterhead knife extending inwardly of the cutterhead and the face surface of the stationary knife extending outwardly of the cutterhead, the end surface of one of said knives including a portion bounded by the respective cutting edge which has a greater wear resistance than the adjoining face surface, the wear resistance differential of the end and face surfaces of said one knife being of such magnitude as to cause the face surface of said one knife to wear away from the cutting edge thereof during operation of the crop reducing means, thereby perpetuating the sharpness of the cutting edge of said one knife during such operation.

2. The invention defined in claim 1 wherein the end surface of the other of said knives includes a portion bounded by the respective cutting edge which has a greater wear resistance than the adjoining face surface, the wear resistance differential of the end and face surfaces of said other knife being of such magnitude as to cause the face surface of said other knife to wear away from the cutting edge thereof during operation of the crop reducing means, thereby perpetuating the sharpness of the cutting edge of said other knife during such operation.

3. In combination with a forage harvester having a frame, a cutterhead housing mounted on the frame and including a crop inlet opening, and conveyor means mounted adjacent to the inlet opening for advancing crop material into the housing through the opening, crop reducing means comprising: a stationary shear bar mounted adjacent to the cutterhead housing inlet and including a relatively sharp horizontal shear edge; and an axially horizontal, cylinder-type cutterhead rotatably mounted within the housing in cooperative cutting relation with the shear bar for reducing the crop material, the cutterhead being rotatable about an axis generally parallel with the shear edge of the shear bar and including at least one knife having a relatively sharp cutting edge defining an imaginary cylindrical surface as the cutterhead rotates, the knife having a leading surface, relative to the direction of cutterhead rotation, extending outwardly from the cutterhead axis and terminating at the cutting edge on the imaginary cylindrical surface, and an arcuate end surface adjoining the leading surface along the cutting edge and lying substantially on the imaginary cylindrical surface, the arcuate end surface of the knife including a portion bounded by the cutting edge which has a greater wear resistance than the leading surface of the knife, the wear resistance differential of the surfaces being of such magnitude as to cause the leading surface to wear away from the cutting edge during operation of the crop reducing means, thereby perpetuating the sharpness of the cutting edge during such operation and substantially maintaining the cutting edge on the imaginary cylindrical surface initially defined thereby.

4. The invention defined in claim 3 wherein the portion of the arcuate end surface of the knife bounded by the cutting edge is hardfaced by welding.

5. The invention defined in claim 3 wherein the shear bar includes an end surface bounded by the shear edge and disposed substantially tangentially relative to the cutterhead, and a face surface adjoining the end surface along the shear edge and disposed substantially radially relative to the cutterhead, the end surface of the bar including a portion bounded by the shear edge which has a greater wear resistance than the face surface of the bar, the wear resistance differential of the end and face surfaces being of such magnitude as to cause the face surface to wear away from the shear edge during operation of the crop reducing means, thereby perpetuating the sharpness of the shear edge during such operation and substantially maintaining the initial clearance between the shear edge and the surface initially defined by the cutterhead knife.

6. In combination with the forage harvester having a frame, a cutterhead housing mounted on the frame and including a crop inlet opening, and conveyor means mounted adjacent to the inlet opening for advancing crop material into the housing through the opening, crop reducing means comprising: an axially horizontal, cylinder-type cutterhead rotatably mounted within the housing and including at least one knife having a relatively sharp cutting edge defining an imaginary cylindrical surface as the cutterhead rotates; and a stationary shear bar cooperating with the cutterhead knife to reduce the crop material, the shear bar being mounted adjacent to the crop inlet opening in the housing and having a relatively sharp shear edge substantially parallel with the axis of the cutterhead and in close proximity to the imaginary cylindrical surface defined by the knife, the shear bar including an end surface bounded by the shear edge and disposed substantially tangentially relative to the cutterhead, and a face surface adjoining the end surface along the shear edge and disposed substantially radially relative to the cutterhead, the end surface of the bar including a portion bounded by the shear edge which has a greater wear resistance than the face surface of the bar, the wear resistance differential of the end and face surfaces being of such magnitude as to cause the face surface to wear away from the shear edge during operation of the crop reducing means, thereby perpetuating the sharpness of the shear edge during such operation and substantially maintaining the initial clearance between the shear edge and the surface initially defined by the cutterhead knife.

7. The invention defined in claim 6 wherein the portion of the end surface of the bar bounded by the shear edge is hardfaced by welding.

8. The invention defined in claim 6 wherein the cutterhead knife includes a leading surface, relative to the direction of cutterhead rotation, extending outwardly from the cutterhead axis and terminating at the cutting edge on the imaginary cylindrical surface, and an arcuate end surface adjoining the leading surface along the cutting edge and lying substantially on the imaginary cylindrical surface, the arcuate end surface of the knife including a portion bounded by the cutting edge which has a greater wear resistance than the leading surface of the knife, the wear resistance differential of the surfaces being of such magnitude as to cause the leading surface to wear away from the cutting edge during operation of the crop reducing means, thereby perpetuating the sharpness of the cutting edge during such operation and substantially maintaining the cutting edge on the imaginary cylindrical surface initially defined thereby.

9. In combination with a forage harvester having a frame, a cutterhead housing mounted on the frame and including a crop inlet opening, and conveyor means mounted adjacent to the inlet opening for advancing crop material into the housing through the opening, crop reducing means comprising: a stationary shear bar mounted adjacent to the cutterhead housing inlet and including a relatively sharp horizontal shear edge; and an axially horizontal, cylinder-type cutterhead rotatably mounted within the housing in cooperative cutting relation with the shear bar for reducing the crop material, the cutterhead being rotatable about an axis generally parallel with the shear edge of the shear bar and including at least one knife having a relatively sharp cutting edge defining an imaginary cylindrical surface as the cutterhead rotates, the knife having a leading surface, relative to the direction of cutterhead rotation, extending outwardly from the cutterhead axis and terminating at the cutting edge on the imaginary cylindrical surface, and an arcuate end surface adjoining the leading surface along the cutting edge and lying substantially on the imaginary cylindrical surface, the arcuate end surface of the knife including a portion bounded by the cutting edge which is covered with a relatively thin layer of material having a greater wear resistance than that of the material composing the remainder of the knife, the wear resistance differential of the materials being of such magnitude as to cause the leading surface to wear away from the thin layer of material on the arcuate end surface during operation of the crop reducing means, thereby perpetuating the sharpness of the cutting edge during such operation and substantially maintaining the cutting edge on the imaginary cylindrical surface initially defined thereby.

10. In combination with the forage harvester having a frame, a cutterhead housing mounted on the frame and including a crop inlet opening, and conveyor means mounted adjacent to the inlet opening for advancing crop material into the housing through the opening, crop reducing means comprising: an axially horizontal, cylinder-type cutterhead rotatably mounted within the housing and including at least one knife having a relatively sharp cutting edge defining an imaginary cylindrical surface as the cutterhead rotates; and a stationary shear bar cooperating with the cutterhead knife to reduce the crop material, the shear bar being mounted adjacent to the crop inlet opening in the housing so that the crop passes over it and having a relatively sharp shear edge substantially parallel with the axis of the cutterhead and in close proximity to the imaginary cylindrical surface defined by the knife, the shear bar including an end surface bounded by the shear edge and disposed substantially tangentially relative to the cutterhead, and a face surface adjoining the end surface along the shear edge and disposed substantially radially relative to the cutterhead, the end surface of the bar including a portion bounded by the shear edge which is covered with a relatively thin layer of material having a greater wear resistance than that of the material composing the remainder of the bar, the wear resistance differential of the materials being of such magnitude as to cause the face surface to wear away from the thin layer of material on the end surface during operation of the crop reducing means, thereby perpetuating the sharpness of the shear edge during such operation and substantially maintaining the initial clearance between the shear edge and the surface initially defined by the cutterhead knife.

11. In combination with a forage harvester having a frame, a cutterhead housing mounted on the frame and including a crop inlet opening, and conveyor means mounted adjacent to the inlet opening for advancing crop material into the housing through the opening, crop reducing means comprising: a stationary shear bar mounted adjacent to the cutterhead housing inlet and including a relatively sharp horizontal shear edge; and an axially horizontal, cylinder-type cutterhead rotatably mounted within the housing in cooperative cutting relation with the shear bar for reducing the crop material, the cutterhead being rotatable about an axis generally parallel with the shear edge of the shear bar and including at least one knife having a relatively sharp cutting edge defining an imaginary cylindrical surface as the cutterhead rotates, the knife having a leading surface, relative to the direction of cutterhead rotation, extending outwardly from the cutterhead axis and terminating at the cutting edge on the imaginary cylindrical surface, and an outer end surface adjoining the leading surface along the cutting edge and forming an acute angle therewith, the outer end surface of the knife including a portion bounded by the cutting edge which has a greater wear resistance than the leading surface of the knife, the wear resistance differential of the surfaces being of such magnitude as to cause the leading surface to wear away from the cutting edge during operation of the crop reducing means, thereby perpetuating the sharpness of the cutting edge during such operation.

12. The invention defined in claim 11 wherein the outer end surface of the knife lies substantially on the imaginary cylindrical surface defined by the knife, whereby a constant clearance is maintained between the cutting edge of the knife and the shear edge of the shear bar notwithstanding wear of the cutting edge.

13. Cutting apparatus comprising: a rotary cutterhead having at least one knife rotatable about an axis and having a relatively sharp cutting edge; and a shear bar disposed in cooperative cutting relation with the cutterhead knife and having a relatively sharp shear edge substantially parallel and in close proximity to the surface defined by the cutting edge of the cutterhead knife, said shear edge being formed by the intersection of end and face surfaces of the shear bar, said end surface extending substantially parallel to the direction of travel of the cutterhead knife as it passes in close proximity to the shear edge of the shear bar and including a portion bounded by the shear edge which has a greater wear resistance than the face surface of the shear bar, the wear resistance differential of the end and face surfaces being of such magnitude as to cause the face surface to wear away from the cutting edge due to the abrasive action of the material being cut engaging the face surface during operation of the apparatus, thereby perpetuating the sharpness of the shear edge during such operation and substantially maintaining the initial clearance between the shear edge and the surface initially defined by the cutterhead knife.

14. The invention defined in claim 13 wherein the clearance between the surface defined by the cutting edge of the cutterhead knife and the end surface of the shear bar is a minimum at the shear edge of the latter and increases in the direction of travel of the cutterhead to provide relief between the knife and shear bar.

15. The invention defined in claim 13 wherein the portion of the end surface of the shear bar which has a greater wear resistance than the face surface of the shear bar comprises a relatively thin layer of hardfacing material, the upper transverse edge of the hardfacing material forming the shear edge of the shear bar.

16. In a forage harvester having a mobile housing structure movable forwardly over the ground, a transverse cutterhead having circumferentially spaced knives supported in the housing structure and rotatably driven to have its forward side moving downwardly; a complementary shear bar supported in the housing forwardly of and in close proximity to the cutterhead and having an upper rear transverse corner with an upper face extending forwardly from the corner and a depending face extending downwardly from the corner and alongside the cutterhead as it passes in close proximity to the shear bar, said latter face having a thin hardened and abrasion-resistant layer of material with an upper horizontal edge at said corner defining the shear edge of the shear bar; said upper surface being subject to abrasive wear by crop material moving against the surface toward the cutterhead to effect relief in the upper surface beginning at said cutting edge and extending forwardly therefrom; and means for conveying crop material over said shear bar to the cutterhead.

17. The invention defined in claim 16 wherein the clearance between the surface defined by the cutting edge of the cutterhead knife and the end surface of the shear bar is a minimum at the shear edge of the latter and increases in the direction of travel of the cutterhead to provide relief between the knife and shear bar.

18. The invention defined in claim 16 wherein said cutterhead knives include a leading face surface relative to the direction of travel of the knives and extending outwardly from the axis of rotation of the cutterhead to a terminal edge; and an end surface joining the face surface along said terminal edge and extending rearwardly therefrom relative to the direction of travel of the knife, the end surface having a thin, hardened and abrasion-resistant layer of material with a generally transverse edge at the terminal edge of the face surface and defining the cutting edge of the knife, said leading face surface being subject to abrasive wear edge; and an end surface joining the face surface along said terminal edge and extending rearwardly therefrom relative to the direction of travel of the knife, the end surface having a thin, hardened and abrasion-resistant layer of material with a generally transverse edge at the terminal edge of the face surface and defining the cutting edge of the knife, said leading face surface being subject to abrasive wear by crop material engaging said leading surface during operation of the cutterhead to effect relief in the leading surface beginning at said cutting edge and extending inwardly therefrom.

19. The invention defined in claim 18 wherein the end surface of the knife lies substantially on the surface traced by the cutting edge of the knife when the cutterhead is rotated.

20. In a forage harvester, a housing structure, a rotatable cutterhead having knives thereon extending transversely across the housing and driven to have the forward side thereof move downwardly; a shear bar forward of the cutterhead fixed to the housing structure and having an upper surface over which crop material moves to the cutterhead and a rear surface depending from the upper surface and defining a transverse shear edge at its juncture with the upper surface and being cooperable with the knives on the cutterhead to chop crop material moving over the upper surface, said upper surface being subject to wear by the abrasive action of the crop material moving over the surface, and said rear surface being substantially equidistant from the adjacent surface defined by the cutterhead knives as the cutterhead is rotated and having a thin hardened facing extending downwardly from the shear edge that is abrasion resistant in comparison with the upper surface; and conveyor means for moving crop material over the upper surface to the cutterhead.

21. The invention defined in claim 20 wherein the clearance between the surface defined by the cutting edge of the cutterhead knife and the end surface of the shear bar is a minimum at the shear edge of the latter and increases in the direction of travel of the cutterhead to provide relief between the knife and shear bar.

22. The invention defined in claim 20 wherein said cutterhead knives include a leading surface relative to the direction of travel of the knives and extending outwardly from the axis of rotation of the cutterhead, said leading surface engaging the crop material during operation of the cutterhead; and an end surface depending from the leading surface and defining a cutting edge at its juncture with the leading surface extending transversely across the housing, said end surface having a thin, hardened facing bounded by the cutting edge of the knife that is abrasion resistant in comparison with the leading surface.

23. The invention defined in claim 22 wherein the end surface of the cutterhead knife lies substantially on the surface traced by the cutting edge of the knife when the cutterhead is rotated.

24. Cutting apparatus comprising: housing means; a stationary shear bar mounted on said housing means and including a relatively sharp, elongated shear edge; and a rotary cutterhead mounted on said housing means and having at least one knife rotatable about an axis, said knife having a relatively sharp cutting edge cooperable with the shear edge of the shear bar to shear material passing across said bar toward said cutterhead, the cutting edge of said knife defining an imaginary surface lying in close proximity to the shear edge of the shear bar as the cutterhead rotates, said knife having a leading face surface relative to its direction of rotation and an end surface lying substantially on the surface defined by the cutting edge, said face and end surfaces intersecting to form said cutting edge, the end surface of the knife including a portion bounded by the cutting edge which has a greater wear resistance than the leading face surface of the knife, the wear resistance differential of the surfaces being of such magnitude as to cause the leading face surface to wear away from the cutting edge during operation of the apparatus, thereby perpetuating the sharpness of the cutting edge during such operation and substantially maintaining the cutting edge on the imaginary surface initially defined by the cutting edge.

25. In a forage harvester, a housing structure; a shear bar mounted on the housing structure and having intersecting end and face surfaces, the end surface having a thin layer of hardfacing material fixed thereto with an edge lying at the intersection of said surfaces and forming a relatively sharp shear edge; a cutterhead rotatably mounted in the housing structure and having at least one knife cooperable with the shear bar to chop crop material, said knife having a relatively sharp cutting edge defining an imaginary surface lying in close proximity to the end surface of the shear bar as the cutterhead rotates, the clearance between the imaginary surface and the end surface being a minimum at the cutting edge of the shear bar and increasing in the direction of rotation of the cutterhead knife to provide relief between said knife and said shear bar; means for advancing a mat of crop material across the face surface of the shear bar toward the cutterhead, the cutterhead knives being operable to engage and compress the mat against the face surface of the shear bar as the knife approaches the shear edge, the pressure thus exerted on the shear bar by the crop material being sufficient, over an extended period of operation, to cause the upper edge of the hardfacing material to wear and advance along the end surface of the shear bar in the direction of travel of the cutterhead knife, and to cause the softer material adjoining the hardfacing material along the face surface of the shear bar to wear away from the shear edge, whereby the action of the cutterhead on the crop material maintains the sharpness of and substantially maintains the initial clearance between the respective cutting edges of the knife and shear bar.

26. For use in a forage harvester having a frame, a rotary cutterhead supported on the frame and having at least one knife thereon defining an imaginary surface as the cutterhead is rotated, and feed means for feeding crop material to the cutterhead, the improvement residing in a shear bar adapted to be supported on the frame between the feed means and cutterhead so that material will move across the shear bar as it is fed to the cutterhead, the shear bar being cooperable with said rotary cutterhead to shear crop material and comprising: intersecting end and face surfaces, the end surface including a portion covered by a thin layer of highly wear-resistant material facing the cutterhead and terminating at an edge along the intersection of the end and face surfaces to define the shear edge of the bar, whereby in operation as crop material moves across the shear bar the abrasive action of the material will cause the face surface of the bar to wear away from the thin layer of wear-resistant material forming the shear edge of the bar, and said shear edge will thus be maintained in a sharp condition and at substantially the same distance from the imaginary surface initially defined by the cutterhead despite such wear of the face surface.

27. For use in a forage harvester having a mobile housing structure, an axially transverse, cylindrical cutterhead rotatably supported in the housing and having a plurality of circumferentially spaced knives thereon, said knives having relatively sharp cutting edges defining an imaginary cylindrical surface as the cutterhead rotates, and feed means supported in the housing forwardly of the cutterhead and operative to feed crop material rearwardly to the cutterhead, the improvement residing in a shear bar cooperable with the cutterhead to shear said crop material, said shear bar comprising: an elongated bar having substantially planar end and face surfaces intersecting to form a relatively sharp edge, said end surface having a thin layer of material affixed thereto with a thin edge lying along the edge defined by the intersection of the surfaces and comprising the cutting edge of the bar, said material composing the layer having a greater resistance to abrasion than the material composing the remainder of the bar, said bar being adapted for mounting on the housing structure between the feed means and cutterhead so that the shear edge is in close proximity to the imaginary cylindrical surface defined by the cutterhead knives and the end surface of the bar extends substantially tangentially relative to the cylindrical surface, whereby in operation the abrasive action of crop material moving over the face surface of the bar will cause the face surface to wear away from the layer of abrasion-resistant material on the end surface, thereby perpetuating the sharpness of the shear edge and substantially maintaining the shear edge on the end surface of the bar.

28. In combination with a forage harvester having a frame, a cutterhead housing mounted on the frame and including a crop inlet opening, and conveyor means mounted adjacent to the inlet opening for advancing crop material into the housing through the opening, crop reducing means comprising: a stationary shear bar mounted adjacent to the cutterhead housing inlet and including a relatively sharp horizontal shear edge; and an axially horizontal, cylinder-type cutterhead rotatably mounted within the housing in cooperative cutting relation with the shear bar for reducing the crop material, the cutterhead being rotatable about an axis generally parallel with the shear edge of the shear bar and including at least one knife having a relatively sharp cutting edge defining an imaginary cylindrical surface as the cutterhead rotates, the knife having a leading surface, relative to the direction of cutterhead rotation, extending outwardly from the cutterhead axis and terminating at the cutting edge on the imaginary cylindrical surface, and an arcuate end surface adjoining the leading surface along the cutting edge and lying on the imaginary cylindrical surface, the arcuate end surface of the knife including a portion bounded by the cutting edge which has a greater wear resistance than the leading surface of the knife, the wear resistance differential of the surfaces being of such magnitude as to cause the leading surface to wear away from the cutting edge during operation of the crop reducing means, thereby perpetuating the sharpness of the cutting edge during such operation.

29. The invention defined in claim 28 wherein the portion of the arcuate end surface of the knife bounded by the cutting edge is hardfaced by welding.

30. The invention defined in claim 28 wherein the shear bar includes an end surface bounded by the shear edge and disposed substantially tangentially relative to the cutterhead, and a face surface adjoining the end surface along the shear edge and disposed substantially radially relative to the cutterhead, the end surface of the bar including a portion bounded by the shear edge which has a greater wear resistance than the face surface of the bar, the wear resistance differential of the end and face surfaces being of such magnitude as to cause the face surface to wear away from the cutting edge during operation of the crop reducing means, thereby perpetuating the sharpness of the cutting edge during such operation.

31. In combination with a forage harvester having a frame, a cutterhead housing mounted on the frame and including a crop inlet opening, and conveyor means mounted adjacent to the inlet opening for advancing crop material into the housing through the opening, crop reducing means comprising: a stationary shear bar mounted adjacent to the cutterhead housing inlet and including a relatively sharp horizontal shear edge; and an axially horizontal, cylinder-type cutterhead rotatably mounted within the housing in cooperative cutting relation with the shear bar for reducing the crop material, the cutterhead being rotatable about an axis generally parallel with the shear edge of the shear bar and including at least one knife having relatively sharp cutting edge defining an imaginary cylindrical surface as the cutterhead rotates, the knife having a leading surface, relative to the direction of cutterhead rotation, extending outwardly from the cutterhead axis and terminating at the cutting edge on the imaginary cylindrical surface, and an arcuate end surface adjoining the leading surface along the cutting edge and lying on the imaginary cylindrical surface, the arcuate end surface of the knife including a portion bounded by the cutting edge which is covered with a relatively thin layer of material having a greater wear resistance than that of the material composing the remainder of the knife, the wear resistance differential of the materials being of such magnitude as to cause the leading surface to wear away from the thin layer of material on the arcuate end surface during operation of the crop reducing means, thereby perpetuating the sharpness of the cutting edge during such operation.

* * * * *